United States Patent
Choi et al.

(10) Patent No.: US 10,131,233 B2
(45) Date of Patent: Nov. 20, 2018

(54) BATTERY CHARGING CONTROL SYSTEM AND METHOD FOR VEHICLE

(71) Applicant: HYUNDAI MOTOR COMPANY, Seoul (KR)

(72) Inventors: Kum Lim Choi, Seoul (KR); Jae Wang Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/839,278

(22) Filed: Dec. 12, 2017

(65) Prior Publication Data
US 2018/0099572 A1   Apr. 12, 2018

Related U.S. Application Data

(62) Division of application No. 14/945,124, filed on Nov. 18, 2015, now Pat. No. 9,878,623.

(30) Foreign Application Priority Data

Sep. 18, 2015  (KR) .......................... 10-2015-0132164

(51) Int. Cl.
*H02J 7/00* (2006.01)
*B60L 11/18* (2006.01)

(52) U.S. Cl.
CPC ....... *B60L 11/1811* (2013.01); *B60L 11/1861* (2013.01); *B60L 11/1868* (2013.01); *B60L 2210/40* (2013.01)

(58) Field of Classification Search
USPC ................................. 320/104, 109, 162, 163
See application file for complete search history.

(56) References Cited

U.S. PATENT DOCUMENTS

| | | | |
|---|---|---|---|
| 8,952,564 B2 | 2/2015 | Kamichi et al. | |
| 9,317,050 B2 * | 4/2016 | Kim ........................ | B60L 11/00 |

(Continued)

FOREIGN PATENT DOCUMENTS

| | | |
|---|---|---|
| JP | H02-070201 A | 3/1990 |
| JP | H08-228408 A | 9/1996 |

(Continued)

OTHER PUBLICATIONS

Office Action dated Jun. 20, 2017 in corresponding Korean Application No. 10-2015-0132164, 3 pages.
Korean Notice of Allowance dated Jun. 20, 2017, from corresponding Korean Application 10-2015-0132164, 3pp.

*Primary Examiner* — Brian Ngo
(74) *Attorney, Agent, or Firm* — Brinks Gilson & Lione

(57) ABSTRACT

A battery charging control method for a vehicle may include: a failure determining step of determining, by a controller, whether a first voltage converter and a second voltage converter equipped in the vehicle are broken; a charging requiring determining step of determining, by the controller, whether an auxiliary battery needs to be charged when the first voltage converter and the second voltage converter are not broken; and a charging step of charging, by the controller, the auxiliary battery by connecting an input terminal of the auxiliary battery to an output terminal of the first voltage converter outputting a voltage higher than a voltage of an output terminal of the second voltage converter and operating an electric load by connecting an input terminal of the electric load of the vehicle to the output terminal of the second voltage converter, when the auxiliary battery needs to be charged.

3 Claims, 2 Drawing Sheets

(56) References Cited

U.S. PATENT DOCUMENTS

| | | | | |
|---|---|---|---|---|
| 2010/0231178 | A1* | 9/2010 | Handa | H02J 7/0065 |
| | | | | 320/163 |
| 2012/0112684 | A1* | 5/2012 | Xu | B60L 3/0046 |
| | | | | 320/101 |
| 2012/0306263 | A1* | 12/2012 | Tashiro | B60L 11/1868 |
| | | | | 307/9.1 |
| 2013/0035814 | A1 | 2/2013 | Boyer et al. | |
| 2013/0221921 | A1* | 8/2013 | Ang | B60L 11/1811 |
| | | | | 320/109 |
| 2014/0112044 | A1* | 4/2014 | Kawaguchi | H01F 27/02 |
| | | | | 363/131 |
| 2014/0176085 | A1* | 6/2014 | Maruno | G01R 31/3679 |
| | | | | 320/162 |
| 2014/0203759 | A1* | 7/2014 | Sugiyama | B60L 1/003 |
| | | | | 320/104 |
| 2014/0293655 | A1* | 10/2014 | Inaba | H01F 27/255 |
| | | | | 363/15 |
| 2015/0094887 | A1 | 4/2015 | Kawashima | |
| 2015/0291054 | A1* | 10/2015 | Duan | B60L 11/1874 |
| | | | | 429/50 |
| 2015/0306973 | A1* | 10/2015 | Gunnerud | B60L 11/1861 |
| | | | | 320/162 |
| 2015/0352965 | A1* | 12/2015 | Inaba | H01F 37/00 |
| | | | | 363/131 |
| 2016/0301119 | A1* | 10/2016 | Izumi | H01M 10/613 |

FOREIGN PATENT DOCUMENTS

| | | |
|---|---|---|
| JP | H09-289707 A | 11/1997 |
| JP | 2002-070201 A | 3/2002 |
| JP | 2003-111384 A | 4/2003 |
| JP | 2004-222403 A | 8/2004 |
| JP | 3760820 B2 | 3/2006 |
| JP | 2006-288085 A | 10/2006 |
| JP | 2008-228408 A | 9/2008 |
| JP | 2011-010482 A | 1/2011 |
| JP | 4993036 B2 | 5/2012 |
| JP | 2013-524761 A | 6/2013 |
| JP | 2015-080372 A | 4/2015 |
| JP | 2015-119622 A | 6/2015 |
| JP | 2016-535577 A | 11/2016 |
| KR | 10-2005-0048038 A | 5/2005 |
| KR | 10-2009-0083548 A | 8/2009 |
| KR | 10-2010-0005768 A | 1/2010 |
| KR | 10-2011-0012214 A | 2/2011 |
| KR | 10-2012-0059972 A | 6/2012 |
| KR | 10-2013-0040864 A | 4/2013 |
| KR | 10-2014-0078859 | 6/2014 |
| KR | 10-2015-0075591 A | 7/2015 |
| KR | 10-2015-0080508 A | 7/2015 |
| WO | 2015-112381 A1 | 7/2015 |

* cited by examiner

BATTERY CHARGING CONTROL SYSTEM AND METHOD FOR VEHICLE

CROSS REFERENCE TO RELATED APPLICATION

This application is a divisional application of non-provisional U.S. patent application Ser. No. 14/945,124, filed on Nov. 18, 2015, which claims priority to and the benefit of the Korean Patent Application No. 10-2015-0132164, filed on Sep. 18, 2015, the entirety of each of which are incorporated herein by reference.

FIELD

The present disclosure relates to a battery charging control system and method for a vehicle capable of reducing power consumption.

BACKGROUND

The statements in this section merely provide background information related to the present disclosure and may not constitute prior art.

Recently, a typical internal combustion engine vehicle using fossil fuel as fuel has problems of environmental pollution due to exhaust gas, global warming due to carbon dioxide, a cause of a respiratory disease due to ozone generation, etc. Further, fossil fuel present on the earth is restrictive and therefore may be exhausted in the near future.

Therefore, to solve the above problems, an electric vehicle driven by an electric motor, a hybrid electric vehicle driven by an engine and the electric motor, a fuel cell vehicle driving an electric motor with power generated from a fuel cell, etc., have been developed as eco-friendly vehicles.

A power conversion apparatus is equipped in the eco-friendly vehicle, in which the power conversion apparatus is generally configured to include a high voltage battery and an auxiliary battery and a low voltage DC/DC converter (LDC) which converts a voltage of the high voltage battery into a voltage for charging the auxiliary battery.

Therefore, the eco-friendly vehicles such as a hybrid vehicle and an electric vehicle use both of the high voltage battery and the auxiliary battery, in which the high voltage battery supplies special power to a driving system, an air conditioner, a heater, etc., of a vehicle and the auxiliary battery supplies power to low voltage vehicle loads like a system of the typical vehicle. Further, when the power of the auxiliary battery is insufficient due to the continuous supply of power from the auxiliary battery to the vehicle loads, the auxiliary battery is charged by the LDC.

Therefore, various technologies for the system and method for charging an auxiliary battery using an LDC have been developed. A method for charging an auxiliary battery is provided to secure starting performance of a vehicle and durability of the auxiliary battery by periodically charging the auxiliary battery.

However, we have discovered that since the auxiliary battery and the vehicle loads are generally configured to be connected to an output terminal of the LDC in parallel, power consumed in the vehicle loads at the time of variably controlling the voltage of the LDC for charging the auxiliary battery is also affected, such that the fuel efficiency of the vehicle may be reduced.

SUMMARY

The present disclosure provides a battery charging control system and method for a vehicle capable of improving power consumed in vehicle loads even though an LDC voltage for charging an auxiliary battery is variably controlled.

According to one form of the present disclosure, a battery charging control system for a vehicle includes: a high voltage battery supplying power to a driver of the vehicle; an auxiliary battery supplying power to an electric load of the vehicle; a first voltage converter connecting between the high voltage battery and the auxiliary battery; a second voltage converter connecting between the high voltage battery and the electric load; a switch having one side connected between the first voltage converter and the auxiliary battery and the other side connected between the second voltage converter and the electric load; and a controller controlling a turn on/off of the first voltage converter and the second voltage converter and a turn on/off of the switch depending on whether the first voltage converter and the second voltage converter are broken and the auxiliary battery needs to be charged.

The controller may turn on the switch if it is determined that the first voltage converter or the second voltage converter is broken.

An output terminal voltage of the first voltage converter may be higher than that of the second voltage converter.

The controller may turn on the first voltage converter and the second voltage converter and turn off the switch when the first voltage converter and the second voltage converter are not broken and the auxiliary battery needs to be charged.

The controller may turn off the first voltage converter, turn on the second voltage converter, and turn on the switch when the first voltage converter and the second voltage converter are not broken and the auxiliary battery need not to be charged.

According to another form of the present disclosure, there is provided a battery charging control system for a vehicle, including: a high voltage battery supplying power to a driver of the vehicle; an auxiliary battery supplying power to an electric load of the vehicle; a first voltage converter connecting between the high voltage battery and the auxiliary battery; a second voltage converter connecting between the auxiliary battery and the electric load; a switch having one side connected between the auxiliary battery and the second voltage converter and the other side connected between the second voltage converter and the electric load to be connected to the second voltage converter in parallel; and a controller controlling a turn on/off of the switch depending on whether the first voltage converter and the second voltage converter are broken and the auxiliary battery needs to be charged.

An output terminal voltage of the first voltage converter may be equal to or more than that of the second voltage converter and may be changed within a preset output voltage range and the controller may control the turn on/off of the switch and the output terminal voltage of the first voltage converter depending on whether the first voltage converter and the second voltage converter are broken and the auxiliary battery needs to be charged.

The controller may turn on the switch if it is determined that the first voltage converter or the second voltage converter is broken.

The controller may set the output terminal voltage of the first voltage converter to be a maximum output voltage within the preset output voltage range and turn off the switch when the first voltage converter and the second voltage converter are not broken and the auxiliary battery needs to be charged.

The controller may set the output terminal voltage of the first voltage converter to be a minimum output voltage within the preset output voltage range and turn off the switch when the first voltage converter and the second voltage converter are not broken and the auxiliary battery need not to be charged.

According to still another form of the present disclosure, a battery charging control method for a vehicle includes: a failure determining step of determining, by a controller, whether a first voltage converter and a second voltage converter equipped in the vehicle are broken; a charging requiring determining step of determining, by the controller, whether an auxiliary battery needs to be charged if it is determined that the first voltage converter and the second voltage converter are not broken; and a charging step of charging, by the controller, the auxiliary battery by connecting an input terminal of the auxiliary battery to an output terminal of the first voltage converter outputting a voltage higher than that of the output terminal of the second voltage converter and operating an electric load by connecting an input terminal of the electric load of the vehicle to the output terminal of the second voltage converter, when the auxiliary battery needs to be charged.

The battery charging control method for a vehicle may further include: after the determining on whether an auxiliary battery needs to be charged, a power supplying step of stopping, by the controller, an operation of the first voltage converter and connecting the auxiliary battery and an input terminal of the vehicle load with an output terminal of the second voltage converter in parallel, if it is determined that the auxiliary battery does not need to be charged.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
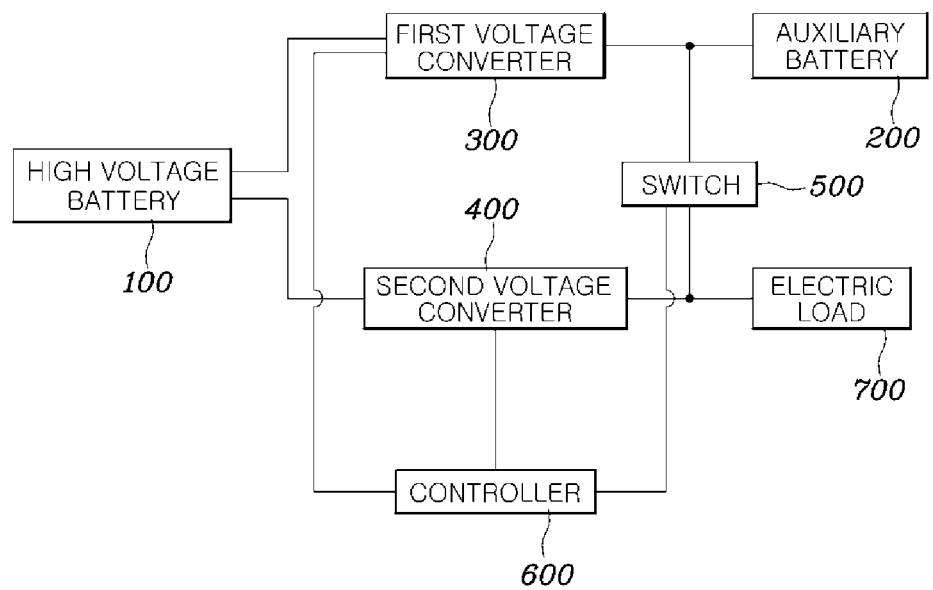
FIG. 1 is a first configuration diagram of a battery charging control system for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
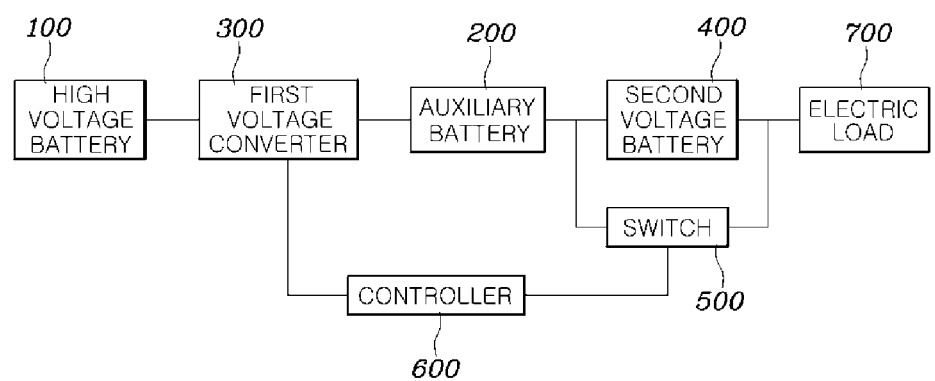
FIG. 2 is a second configuration diagram of a battery charging control system for a vehicle according to another form of the present disclosure.

A configuration of a battery charging control system for a vehicle may be largely divided into configurations of FIGS. 1 and 2. FIGS. 1 and 2 have the same characteristics that an LDC (first voltage converter 300 in FIGS. 1 and 2) for charging an auxiliary battery 200 and an LDC (second voltage converter 400 in FIGS. 1 and 2) for providing power to an electric load 700 are arranged, but as illustrated in FIGS. 1 and 2, there is a slight difference in arranging a switch 500, a first voltage converter 300, and a second voltage converter 400.

Referring to FIG. 1, the battery charging control system for a vehicle according to one form of the present disclosure includes: a high voltage battery 100 supplying power to a driver of the vehicle; an auxiliary battery 200 supplying power to an electric load of the vehicle; a first voltage converter 300 connecting between the high voltage battery and the auxiliary battery; a second voltage converter 400 connecting between the high voltage battery and the electric load 700; a switch 500 having one side connected between the first voltage converter 300 and the auxiliary battery 200 and the other side connected between the second voltage converter 400 and the electric load 700; and a controller 600 controlling a turn on/off of the first voltage converter 300 and the second voltage converter 400 and a turn on/off of the switch 500 depending on whether the first voltage converter 300 and the second voltage converter 400 are broken and the auxiliary battery 200 needs to be charged.

The voltage converter supplying power to the auxiliary battery 200 and the voltage converter supplying power to the electric load 700 are not same but are separately provided, and configurations of a circuit are different for each case by controlling a turn on/off of the switch 500 and the voltage converter depending on whether the voltage converters are broken and the auxiliary battery 200 needs to be charged. The fact that the voltage converter supplying power to the auxiliary battery 200 and the voltage converter supplying power to the electric load 700 are separately provided and the fact of performing a control to make the configurations of the circuits different depending on the auxiliary battery 200 needs to be charged reduce power consumed by the electric load 700 to improve fuel efficiency of the vehicle and the reason of making the configurations of the circuits different depending on whether the voltage converters are broken is to perform an emergency control depending on the failure of the converter.

As described above, when the first voltage converter 300 or the second voltage converter 400 is broken, the voltage converters may not convert a voltage of the high voltage battery 100 into a low voltage and thus may not supply the low voltage to the auxiliary battery 200 and the electric load 700. Therefore, in this case, a separate control is required. As an example of the control, the exemplary form of the present disclosure proposes a method for turning on the switch 500 when the first voltage converter 300 or the second voltage converter 400 is broken.

In the present process, it may be confirmed whether the first voltage converter 300 and the second voltage converter 400 are broken by various methods. Confirming whether the converters are broken by sensing output voltages of each voltage converter is the most general method. In addition, it may also be confirmed whether the converters are broken by mounting a separate fault detection sensor in the converter.

As illustrated in FIG. 1, if it is determined that the first voltage converter 300 and the second voltage converter 400 are broken based on the above methods, the high voltage battery 100 may not apply power to the auxiliary battery 200 and the electric load 700. Therefore, in this case, the switch 500 is turned on to connect the auxiliary battery 200 to the electric load 700, thereby applying power to the electric load 700 by the auxiliary battery 200. For this reason, as the switch 500 illustrated in FIG. 1, a normal close switch may be used. The reason is that when the first voltage converter 300 or the second voltage converter 400 is broken, the switch 500 is always turned on to be able to supply power from the auxiliary battery 200 to the electric load 700.

On the other hand, when the first voltage converter 300 and the second voltage converter 400 are not broken, the voltage converters 300 all may not convert the voltage of the high voltage battery 100 into the low voltage and thus may not supply an appropriate voltage to the auxiliary battery 200 or the electric load 700. Therefore, in this case, the exemplary form of the present disclosure proposes a method for improving fuel efficiency of a vehicle by making the configurations of the circuits different depending on whether the auxiliary battery 200 needs to be charged when each converter is not broken. The reason of making the configurations of the circuits different depending on whether the auxiliary battery 200 needs to be charged is that the voltage for charging the auxiliary battery 200 and the voltage for driving the electric load 700 are different. Describing in detail, it is natural that the voltage for charging the auxiliary battery 200 be higher than a rated voltage of the auxiliary battery 200. The reason is that the auxiliary battery 200 may be charged due to a potential difference. However, the electric load 700 is basically supplied with power from the auxiliary battery 200 and therefore has the same rated voltage as that of the auxiliary battery 200. Consequently, it may be appreciated that the voltage for charging the auxiliary battery 200 is higher than the voltage for driving the electric load 700. Therefore, if the voltages supplied to the auxiliary battery 200 and the electric load 700 depending on whether the auxiliary battery 200 needs to be charged are not supplied without being differentiated but are supplied in a lump, the case in which the auxiliary battery 200 need not be charged is not very problematic, but in the case in which the auxiliary battery 200 needs to be charged, a voltage higher than the rated voltage is supplied even to the electric load 700, such that power consumption consumed by the electric load 700 may be increased, thereby causing a loss of fuel efficiency of the vehicle. For this reason, the present disclosure proposes a system for performing a control by making the configurations of the charging circuit different depending on whether the auxiliary battery 200 needs to be charged.

Here, how it is determined whether the auxiliary battery 200 needs to be charged should be considered and various methods may be used. Generally, whether the auxiliary battery 200 needs to be charged is determined based on a state of charge (SOC) of the auxiliary battery 200. Accordingly, the control unit 600 may determine whether the auxiliary battery 200 needs to be charged based on SOC monitoring of the auxiliary battery 200.

Referring to the foregoing description, when the auxiliary battery 200 needs to be charged, the charging control system is configured to allow the controller to turn on the first voltage converter 300 and the second voltage converter 400 and turn off the switch 500. That is, the first voltage converter 300 is connected only to the auxiliary battery 200 and the second voltage converter 400 is connected only to the electric load 700. Therefore, with this configuration, the voltage for charging the auxiliary battery 200 and the voltage for driving the electric load 700 may be differently applied and therefore the loss of the fuel efficiency may be reduced. The first voltage converter 300 outputs the voltage for charging the auxiliary battery 200 and the second voltage converter 400 outputs the voltage for driving the electric load 700, and therefore for the foregoing reasons, the output terminal voltage of the first voltage converter 300 needs to be higher than that of the second voltage converter 400.

On the other hand, when the auxiliary battery 200 need not be charged, the first voltage converter 300 need not output a voltage higher than the output voltage of the second voltage converter 400. Rather, if the first voltage converter 300 is driven, power is wasted and therefore the fuel efficiency of the vehicle results in aggregation. Therefore, in this case, in the configuration of the system of FIG. 1, the first voltage converter 300 is turned off, the second voltage converter 400 is turned on, and the switch 500 is turned on. By this, the driving of the first voltage battery 300 for charging the auxiliary battery 200 stops and the output voltage of the second voltage converter 400 is transferred to the auxiliary battery 200 and the electric load 700, such that the electric load 700 may be driven at an appropriate operating voltage and the auxiliary battery 200 may be continuously maintained at the appropriate voltage.

The operation of the system when the charging control system is configured as illustrated in FIG. 1 has been described until now. However, the improvement in the fuel efficiency depending on the reduction in unnecessary power consumption of the vehicle which is a target to be achieved by the exemplary form of the present disclosure may be implemented even by a configuration of other systems in addition to the configuration of the system of FIG. 1. Therefore, as an example thereof, the configuration of the system of FIG. 2 will be described below.

The configuration of the system of FIG. 2 is the same as that of FIG. 1. However, only a connection relationship of each component is different. The system of FIG. 2 includes: the high voltage battery 100 supplying power to the driver of the vehicle; the auxiliary battery 200 supplying power to the electric load of the vehicle; the first voltage converter 300 connecting between the high voltage battery 100 and the auxiliary battery 200; the second voltage converter 400 connecting between the auxiliary battery 200 and the electric load 700; the switch 500 having one side connected between the auxiliary battery 200 and the second voltage converter 400 and the other side connected between the second voltage converter 400 and the electric load 700 to be connected to the second voltage converter 400 in parallel; and a controller 600 controlling a turn on/off of the switch 500 depending on whether the first voltage converter 300 and the second voltage converter 400 are broken and the auxiliary battery 200 needs to be charged.

However, differently from the charging control system illustrated in FIG. 1, in the charging control system illustrated in FIG. 2, the output terminal voltage of the first voltage converter 300 is equal to or more than the output terminal voltage of the second voltage converter 400 and is changed within the preset output voltage range and the controller 600 controls the turn on/off of the switch and the output terminal voltage of the first voltage converter 300 depending on whether the first voltage converter 300 and the second voltage converter 400 are broken and the auxiliary battery 200 needs to be charged. With this arrangement, the unnecessary power consumption occurring by applying a voltage higher than necessary to the electric load 700 may be inhibited. Here, the preset output voltage range means a range between the output voltage for charging the auxiliary battery 200 and the output voltage for driving the electric load 700. Therefore, the range may vary depending on a kind of the auxiliary battery 200 and a kind of the electric load 700. However, considering the auxiliary battery 200 for 12 V frequently used and the electric load 700, the output voltage range may be set to be about 14.5 V to 12 V.

Describing in more detail, when the first voltage converter 300 or the second voltage converter 400 is broken, the power of the high voltage battery 100 may not be supplied to the electric load 700 and therefore the power of the auxiliary battery 200 cannot but be used. Therefore, in this case, as illustrated in FIG. 2, the switch 500 is turned on, such that the power of the auxiliary battery 200 may be supplied to the electric load 700. The method for determining whether each voltage converter is broken is already described above, and therefore the description thereof will be omitted.

When the first voltage converter 300 and the second voltage converter 400 are not broken, like the foregoing case, the control method may be different depending on whether the auxiliary battery 200 needs to be charged. When the auxiliary battery 200 needs to be charged, the output terminal voltage of the first voltage converter 300 is set to be as a maximum output voltage within the preset output voltage range and the switch 500 is turned off. In this case, when the auxiliary battery 200 needs to be charged, the output voltage of the first voltage converter 300 is set to be the maximum output voltage corresponding to the voltage for charging the auxiliary battery 200 to charge the auxiliary battery 200 with the corresponding maximum output voltage and the switch 500 is turned off to allow the second voltage converter 400 to supply the driving voltage of the electric load 700. Here, the output voltage of the second voltage converter 400 is the rated voltage of the electric load 700 and corresponds to a voltage lower than the output voltage of the first voltage converter 300. Therefore, when the auxiliary battery 200 needs to be charged, the voltage for charging the auxiliary battery 200 and the voltage for driving the electric load 700 may be divided into two to improve the fuel efficiency of the vehicle as described above.

On the other hand, when the auxiliary battery 200 does not need to be charged, the output terminal voltage of the first voltage converter 300 is set to be as a minimum output voltage within the preset output voltage range and the switch 500 is turned off. In this case, differently from the foregoing case, the output terminal voltage of the first voltage converter 300 is set to be high and thus the auxiliary battery 200 need not be charged. Therefore, the output terminal voltage of the first voltage converter 300 may be set to be the minimum output voltage (as described above, output voltage for driving the electric load 700). In addition, using the same normal close switch as the configuration of the charging control system of FIG. 1 as the switch 500 used in the charging control system of FIG. 2 may easily cope with the failure of the first voltage converter 300 and the second voltage converter 400.

Figure 3:
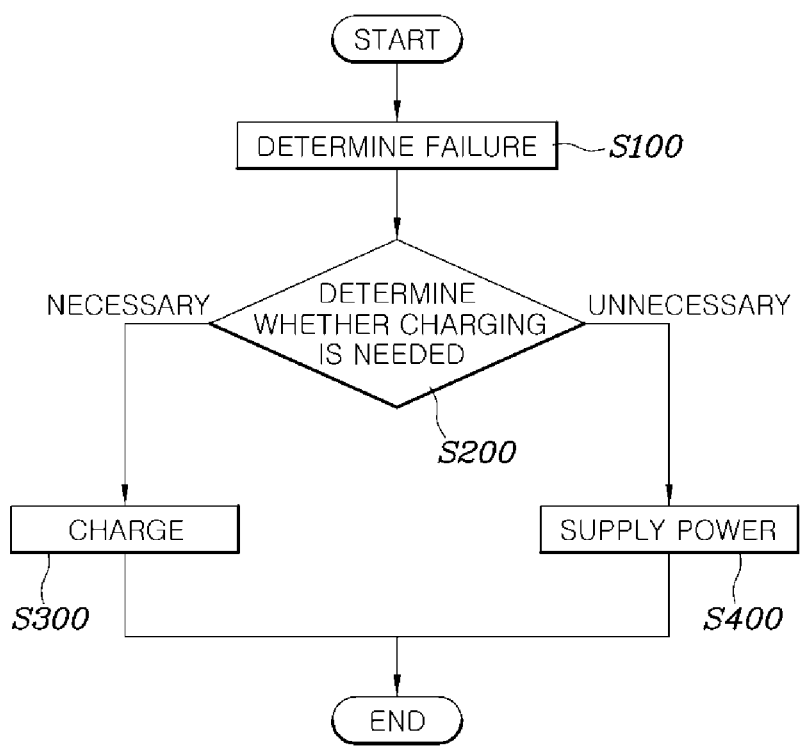
FIG. 3 is a flow chart of a battery charging control method for a vehicle according to the present disclosure.

The charging control method in addition to the charging control system described above may be made as illustrated in FIG. 3. The charging control method according to one form of the present disclosure performs a failure determining step (S100) of determining, by the controller 600, whether the first voltage converter and the second voltage converter equipped in the vehicle are broken; and a charging requiring determining step (S200) of determining, by the controller 600, whether the auxiliary battery 200 needs to be charged if it is determined that the first voltage converter 300 and the second voltage converter 400 are not broken.

The detailed method of the failure determining step (S100) and the charging requiring determining step (S200) are described above and therefore the description thereof will be omitted. Describing in detail steps after the charging requiring determining step (S200), a charging step (S300) of charging, by the controller 600, the auxiliary battery 200 by connecting the input terminal of the auxiliary battery 200 to the output terminal of the first voltage converter 300 outputting the voltage higher than the output terminal voltage of the second voltage converter 400 and operating the electric load 700 by connecting the input terminal of the electric load 700 of the vehicle to the output terminal of the second voltage converter 400 is performed, when it is determined that the auxiliary battery needs to be charged by the SOC, etc., of the auxiliary battery 200 in the charging requiring determining step (S200) is performed.

That is, it may be confirmed by the present step that the voltage for charging the auxiliary battery 200 and the voltage for operating the electric load 700 are divided into two. The auxiliary battery 200 is connected to the output terminal of the first voltage converter 300 which may output a voltage higher than the output terminal voltage of the second voltage converter 400 for charging and the electric load 700 is connected to the output terminal of the second voltage converter 400 to more reduce the power consumption of the electric load 700 than the case in which the auxiliary battery 200 is charged using only the single voltage converter, thereby improving the fuel efficiency of the vehicle.

On the other hand, when the auxiliary battery need not be charged, as described in the detailed description of the charging control system illustrated in FIG. 1, there is no need to drive the first voltage converter 300. In this case, a power supplying step of stopping, by the controller 500, the operation of the first voltage converter 300 and connecting the auxiliary battery 200 and the input terminal of the vehicle load to the output terminal of the second voltage converter 400 in parallel is performed. Therefore, in this case, the electric load 700 is smoothly driven by the second voltage converter 400 and thus the auxiliary battery 200 may continuously maintain an appropriate voltage without being discharged.

As described above, the present disclosure may obtain the following effects.

First, even when the LDC output voltage for charging the auxiliary battery rises, the vehicle loads may not be affected to improve the durability of the vehicle loads.

Second, since the voltage applied to the vehicle loads does not rise in proportion to the increase in the LDC output voltage, the power consumption may be reduced due to the vehicle loads to improve the fuel efficiency of the vehicle.

Although the present disclosure has been shown and described with respect to specific exemplary forms, it will be obvious to those skilled in the art that the present disclosure may be variously modified and altered without departing from the spirit and scope of the present disclosure as defined by the following claims.

What is claimed is:

1. A battery charging control method for a vehicle, comprising:
   a failure determining step of determining, by a controller, whether a first voltage converter and a second voltage converter equipped in the vehicle are broken, wherein the first voltage converter connects a high voltage battery to an auxiliary battery and the second voltage converter connects the high voltage battery to an electric load;
   a charging requiring determining step of determining, by the controller, whether the auxiliary battery needs to be charged when the first voltage converter and the second voltage converter are not broken;
   after the charging requiring determining step, a power supplying step of stopping, by the controller, an operation of the first voltage converter and turning on the switch to connect the auxiliary battery and an input terminal of the vehicle load with an output terminal of the second voltage converter in parallel when the auxiliary battery does not need to be charged; and a charging step of charging, by the controller, the auxiliary battery by turning on the first voltage converter and the second voltage converter to operate the electric load, and turning off a switch which has a first end connected between the first voltage converter and the auxiliary battery and a second end connected between the second voltage converter and the electric load, when the auxiliary battery needs to be charged.

2. The battery charging control method of claim 1, further comprising: after the failure determining step, turning on the switch when the first voltage converter or the second voltage converter is broken.

3. The battery charging control method of claim 1, wherein an output terminal voltage of the first voltage converter is higher than an output terminal voltage of the second voltage converter.

* * * * *